US007922180B2

(12) United States Patent
Meng

(10) Patent No.: US 7,922,180 B2

(45) Date of Patent: Apr. 12, 2011

(54) DEVICE FOR LOCKING AND RELEASING A SCREW BIT

(76) Inventor: Chi-Fen Meng, Taichung (TW)

( * ) Notice: Subject to any disclaimer, the term of this patent is extended or adjusted under 35 U.S.C. 154(b) by 1140 days.

(21) Appl. No.: 11/645,518

(22) Filed: Dec. 27, 2006

(65) Prior Publication Data

US 2008/0121075 A1 May 29, 2008

(30) Foreign Application Priority Data

Nov. 23, 2006 (TW) ............................... 95220643 U

(51) Int. Cl.
*B23B 31/107* (2006.01)

(52) U.S. Cl. ............ 279/143; 279/30; 279/75; 279/905; 279/906; 81/438

(58) Field of Classification Search .................... 279/22, 279/30, 75, 143, 905, 906; 81/177.85, 438; *B23B 31/22, 31/107*
See application file for complete search history.

(56) References Cited

U.S. PATENT DOCUMENTS

| | | | | |
|---|---|---|---|---|
| 3,788,656 | A * | 1/1974 | Smith | 279/143 |
| 6,457,916 | B2 * | 10/2002 | Wienhold | 408/240 |
| 6,637,755 | B2 * | 10/2003 | Chen et al. | 279/22 |
| 6,722,667 | B2 * | 4/2004 | Cantlon | 279/22 |
| 6,935,637 | B2 * | 8/2005 | Cantlon | 279/75 |
| 7,175,185 | B2 * | 2/2007 | Chen | 279/75 |
| 7,287,449 | B2 * | 10/2007 | Abel et al. | 81/177.2 |
| 7,424,841 | B2 * | 9/2008 | Liu | 81/438 |
| 7,448,302 | B2 * | 11/2008 | Huang | 81/438 |
| 7,469,909 | B2 * | 12/2008 | Strauch et al. | 279/75 |
| 7,565,854 | B2 * | 7/2009 | Chiang et al. | 81/467 |
| 7,581,470 | B1 * | 9/2009 | Huang | 81/438 |
| 7,669,860 | B2 * | 3/2010 | Chiang | 279/143 |
| 7,740,249 | B1 * | 6/2010 | Gao | 279/75 |
| 2004/0262856 | A1 * | 12/2004 | Cantlon | 279/22 |
| 2009/0188352 | A1 * | 7/2009 | Huang | 81/438 |
| 2009/0224492 | A1 * | 9/2009 | Lin | 279/82 |

* cited by examiner

*Primary Examiner* — Eric A Gates

(57) ABSTRACT

A screwdriver bit holder structure, whose holder body has a polygon hole, and inside the polygon hole set an inner spring and a sliding tube. The holder body is clipped by a c-clamp, ahead of which are symmetric front balls and holes, and behind which are symmetric middle and back balls and holes. A fixing cap is capped on the holder body. In the back of inner hole of the fixing cap sets a limiting ring, and in the front sets a front recess and a back recess that is designed, by sliding the cap forward and backward along the holder body, to push front balls to fit into the fitting concaves of the bits so as to fix them tightly with the holder body or loose front balls from fitting concaves to release the bits.

4 Claims, 6 Drawing Sheets

DEVICE FOR LOCKING AND RELEASING A SCREW BIT

FIELD OF THE INVENTION

This invention is to introduce a screwdriver bit holder structure, which can prevent driver bits from springing out unexpectedly while being unloaded.

BACKGROUND OF THE INVENTION

A prior art was proposed as Taiwan Patent No. M293121 "Screwdriver Bit Holder Structure (1)", which comprises a screwdriver bit holder that has a polygon hole allowing load or unload of a driver bit, and at least a shaft-axis hole on top of it allowing balls to fit in; a ring clipped on the holder body externally, pushed by a spring component that is set between the ring and the holder body, and its inner part has a pressing wall used to push balls to fix bits. Its features include: at least one shaft-axis hole at the lower part of the holder body for balls to fit in, and a cylinder cavity at the inner part of the polygon hole. A spring component and fixing plate are set inside the cylinder cavity, and the fixing plate has a triangle recess facing the shaft-axis hole. The ring has a concave and a pushing surface facing the shaft-axis hole, and the pressing wall of it is gradient-curved surfaced. Based on aforementioned structure, the pushing surface of the ring can push balls into the triangle recess so as to position the ring and fixing plate, and then utilize the gradient-curved surfaced pressing wall to push balls fit into the concaves of driver bits for tightening.

Although driver bits can be fixed in the polygon hole tightly based on aforementioned structure, it may cause safety concern because the spring component fixed in the fixing plate will suddenly and fully release accumulated power, then pushes fixing plate move outwards rapidly, which further forces the magnetized bits to spring out of the bit holder too powerfully to a dangerous extent when the bits are released by pushing down the ring until the top and bottom balls can leave the concaves of the bits and the triangle recess of fixing plate.

Throughout rigorous tests and researches, the inventor finally devised such an improved structure that enables a driver bit to be unloaded from polygon hole more gently to prevent dangers from powerful ejection of the bit occurring in prior arts. Therefore, a patent application is hereby being filed based on the absolute novelty and capability of industrial application of the invention.

SUMMARY OF THE INVENTION

The screwdriver bit holder structure proposed in this invention is mainly intended to reach following two purposes. First, it can be assembled from the front end of the holder body, simplifying the installation complexity. Second, it enables driver bits to be fixed smoothly and tightly into the holder body, and to be unloaded safely by avoiding powerful ejection occurring in prior arts.

To reach aforementioned purposes, the invention proposes a screwdriver bit holder structure, which comprises: a holder body that sets a polygon hole in one end for loading bits, and at the end of the polygon hole sets a cylinder cavity that houses a inner spring and a sliding tube; a c-clamp clips the holder body externally, and ahead of which are front balls that fit in or unfit from the concaves positioned in the middle of the bits to fix or loose bits; behind the c-clamp are symmetric middle and back balls and holes that can fit with front and back grooves to confine the movements of the sliding tube; A fixing cap is capped on the holder body around polygon hole. A limiting ring is set at the back of the fixing cap, and a front recess and a back recess are set in front of the fixing cap that is designed, by sliding the cap forward and backward along the holder body, to push front balls to fit into the fitting concaves of the bits so as to fix them tightly with the holder body or loose front balls from fitting concaves to release the bits. An outer spring is also installed between the back recess and c-clamp. As a solid improvement, above components enables the proposed screwdriver bit holder easily assembled, and makes sure the bits be loaded tightly or unloaded easily and safely.

DETAILED DESCRIPTION OF THE PREFERRED EMBODIMENT

Figure 1:
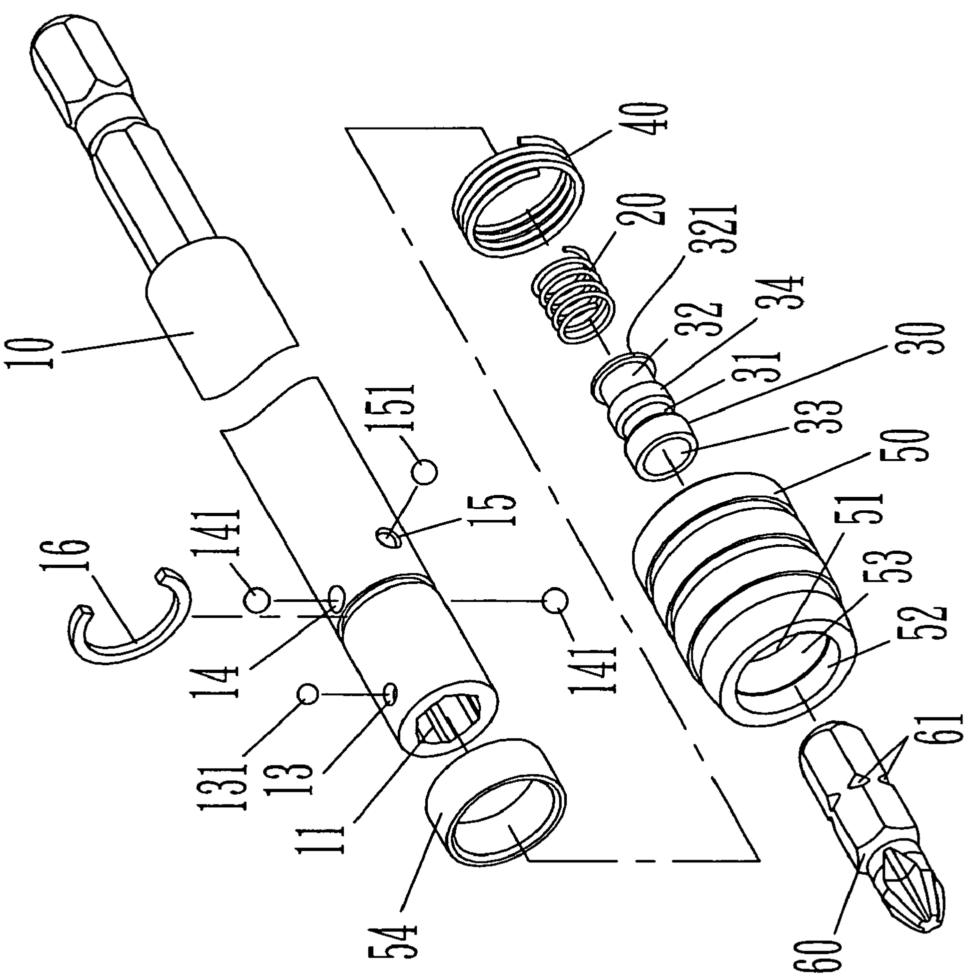
FIG. 1—A breakdown view of the structure of exemplary embodiment
Figure 2:
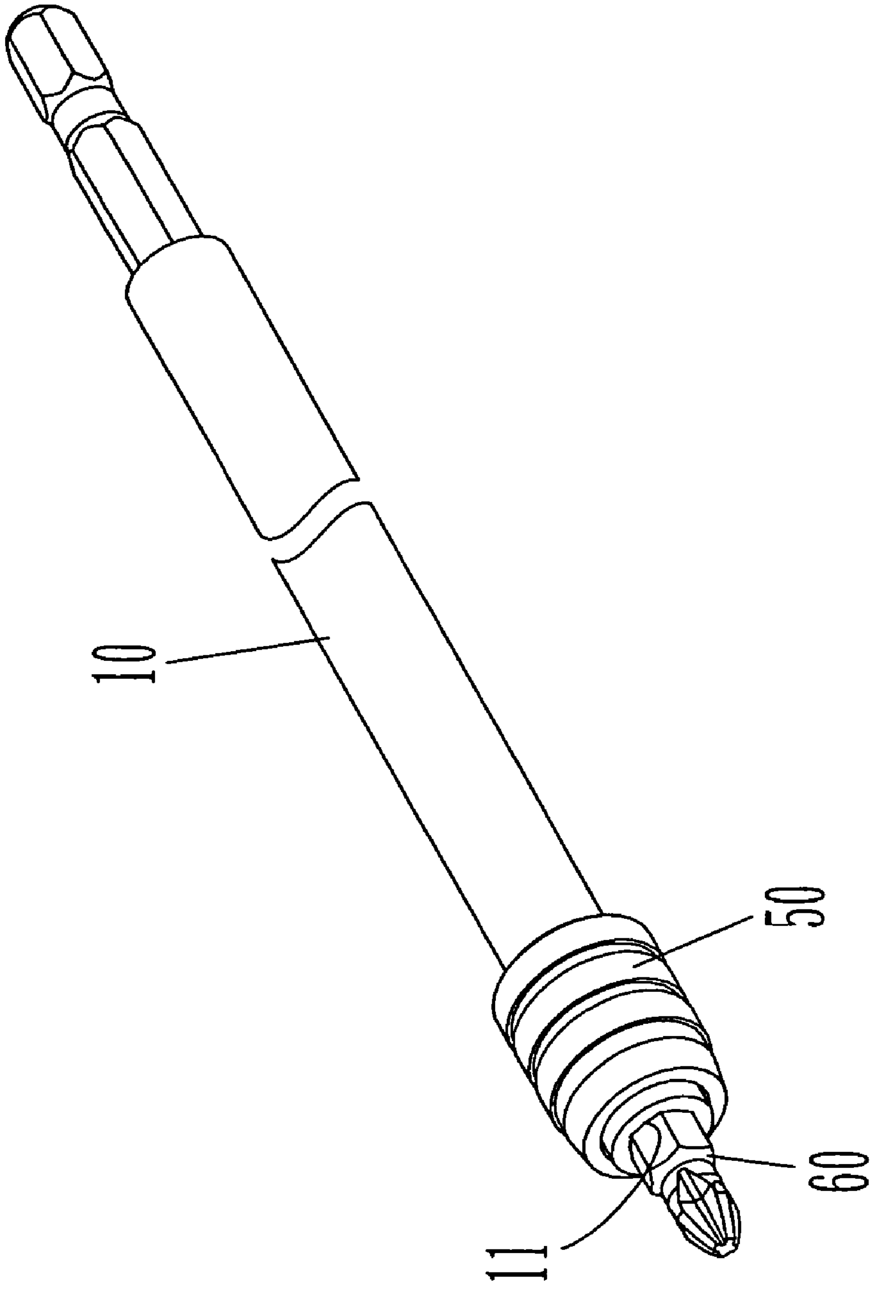
FIG. 2—A put-up view of the structure of exemplary embodiment

Please read the description of an exemplary embodiment as follows with references to FIGS. 1 and 2. The invention proposes a screwdriver bit holder structure, which comprises: a holder body 10 that sets a polygon hole 11 in one end in shaft axis, and at the end of the polygon hole sets a cylinder cavity 12 in the same axis of center as polygon hole. In the same end polygon hole set front ball holes 13, middle ball holes 14, and back ball holes 15 in order that penetrate into the polygon hole 11 and the cylinder cavity 12. The ball holes 13, 14, 15 are filled with front balls 131, middle balls 141, and back balls 151 respectively; A c-clamp 16 is clipped externally around the polygon hole 11, and it is positioned between front ball holes 13 and middle ball holes 14; An inner spring 20 and a sliding tube 30 are set inside the cylinder cavity 12, and the sliding tube has front groove 31 and back groove 32 externally. The middle balls 141 and back balls 151 are contained in either groove. An outer spring 40 is installed around the polygon hole externally with one end against c-clamp 16; a fixing cap 50 has a big inner hole 51 for housing the polygon hole 11 of holder body 10 and the outer spring 40. The inner hole 51 set a front recess 52 and back recess 53 in one end, which is mainly devised to control front balls 131 to fit into or unfit from fitting concave 61 of a bit. Besides, the back recess 53 also provides a wall for the outer spring 40 to against in the other end. A limiting ring 54 is set at the back of inner hole 51 to limit the room the fixing cap 50 can move. Above components are assembled around the front end of the holder body 10, enabling the proposed screwdriver bit holder easily assembled, and reaching featured functions.

For more supplements: about the front ball holes 13 on the polygon hole 11 of the holder body 10, their radius decrease from outside towards inside of the polygon hole 11 to limit the length the front balls 131 can beetle into the polygon hole 11; further, the axis (not shown in the FIG.) of the front ball holes 13 should fall right on either included angle of the polygon hole 11 to make sure front balls 131 can fit perfectly into the fitting concaves 61 located on the included angle of driver bits 60.

Figure 3:
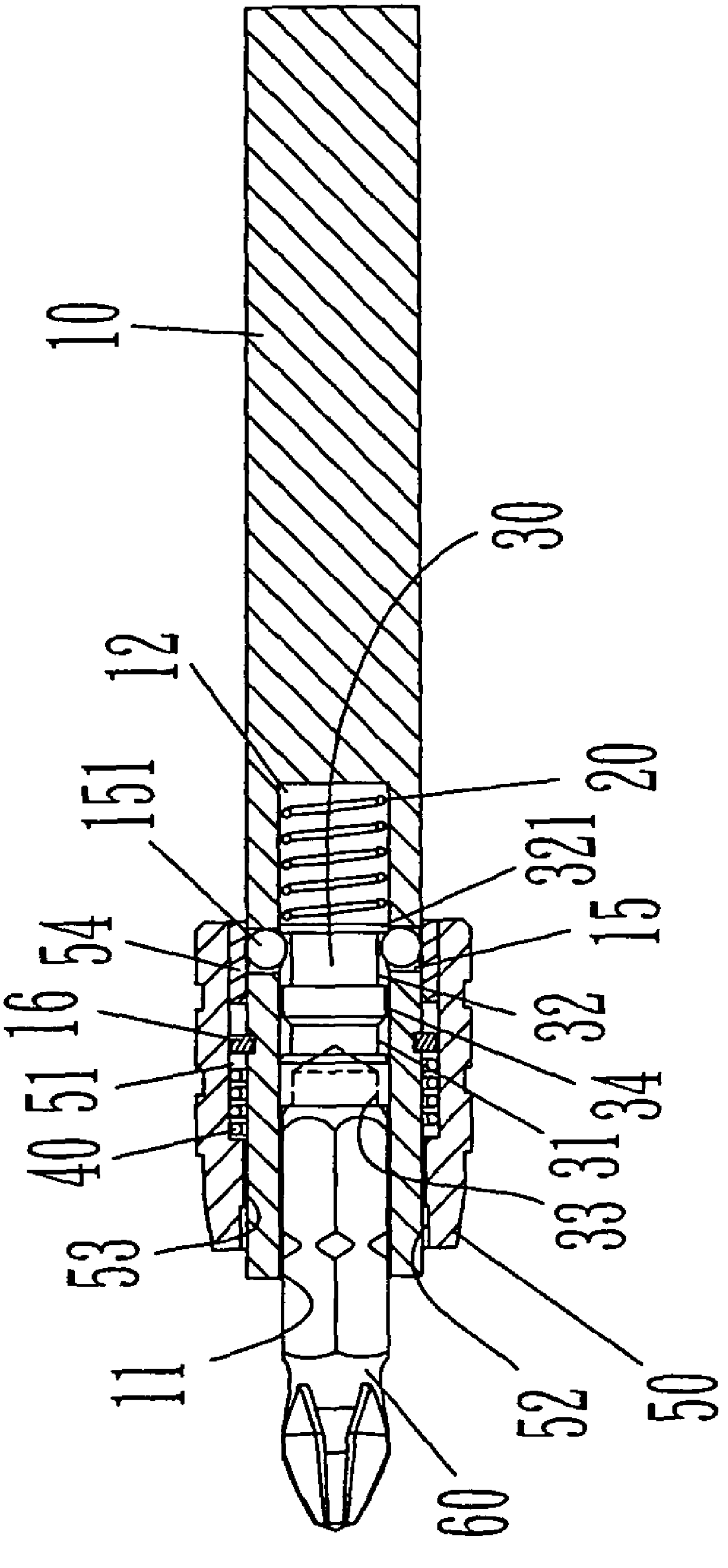
FIG. 3—A sectional view based on FIG. 2 when a driver bit is inserted but not yet fixed inside the polygon hole FIG. 4—A view of FIG. 3 at different angle FIG. 5—A sectional view based on FIG. 2 when a driver bit is fixed inside the polygon hole FIG. 6—A view of FIG. 5 at different angle
Figure 4:
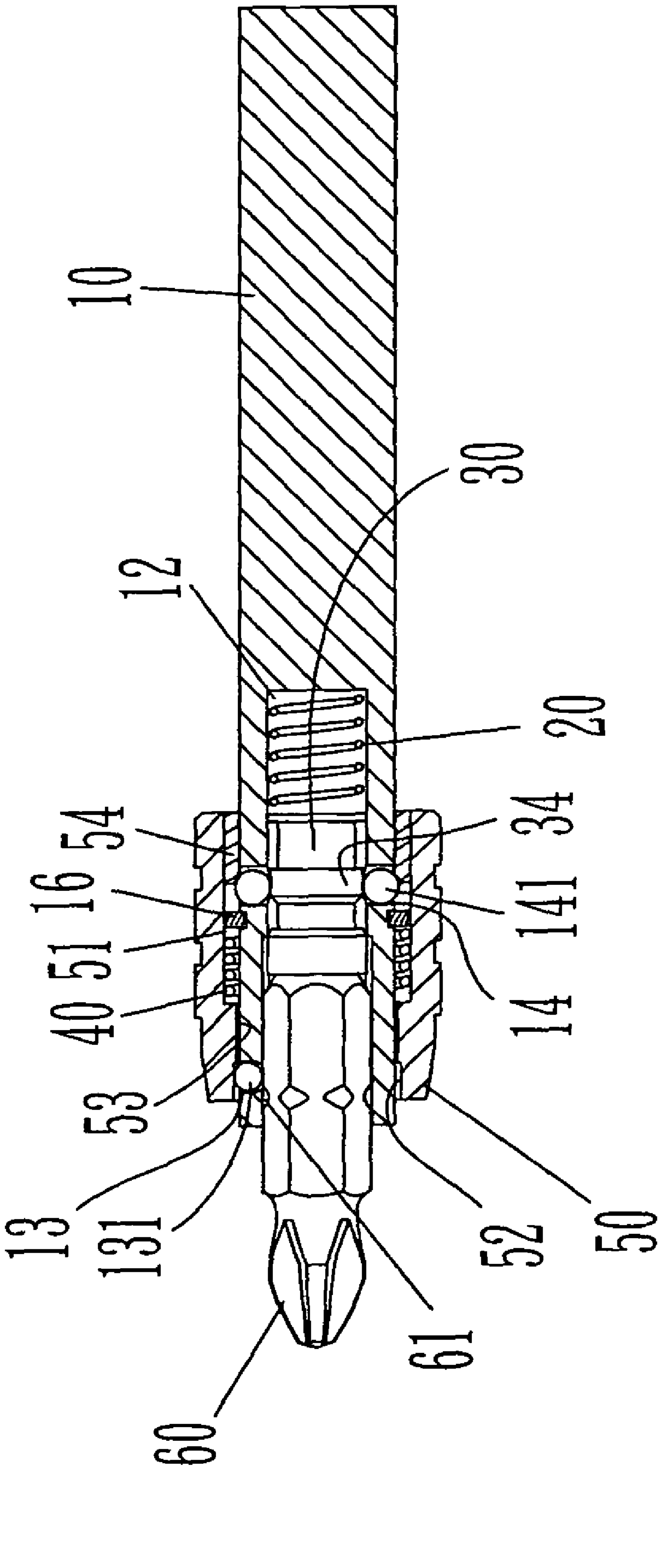

The sliding tube 30 is cylinder shaped. Besides front groove 31 and back groove 32, it also sets a magnet 33 in its front end in order to magnetize the driver bits 60 to prevent its dropping when it is not firmly fixed in the right position. Moreover, please read descriptions of movements before and after the bits are firmly positioned; First, FIGS. 3 and 4 are two different sectional views when a bit 60 is inserted but not firmly fixed in the right position inside the polygon hole.

When no bit is loaded, the inner spring 20 will be stretching out naturally, pushing sliding tube 30 outwards and making the convex ring 34 positioned between front groove 31 and back groove 32 moves forward to simultaneously force two middle balls 141 outwards. Then, because the middle balls 141 beetle out of the holder body 10, the fixing cap 50 will be prevented from falling off holder body 10 due to middle balls' blockage against the limiting ring 54 of holder body 10; And the back balls 151 just touch the inner wall of the limiting ring 54, so the back balls 151 are forced to beetle into the cylinder cavity 12 to nest into the back groove 32, which provides a blockage against stopping ring 321 and thus prevents sliding tube 30 from further forward moving. The outer spring 40 set between holder body 10 and the inner hole 51 of fixing cap 50 is actually against both c-clamp 16 and the side wall of back recess 53 on both ends. Also in natural stretch condition as inner spring, it pushes fixing cap 50 outwards c-clamp 16, which not just forces limiting ring 54 to firmly against middle balls 141, but also makes the front recess 52, whose radius is greater than back recess 53, in line with front ball holes 13. As a result, the front balls 131 nested in the front ball holes 13 could have more moving rooms to stay away from polygon hole 11; Aforementioned describe the status of all the components in natural condition without bits being loaded. When a bit is inserted into the polygon hole, it will be immediately attracted by the magnet 33 of the sliding tube 30, but not yet fixed.

Figure 5:
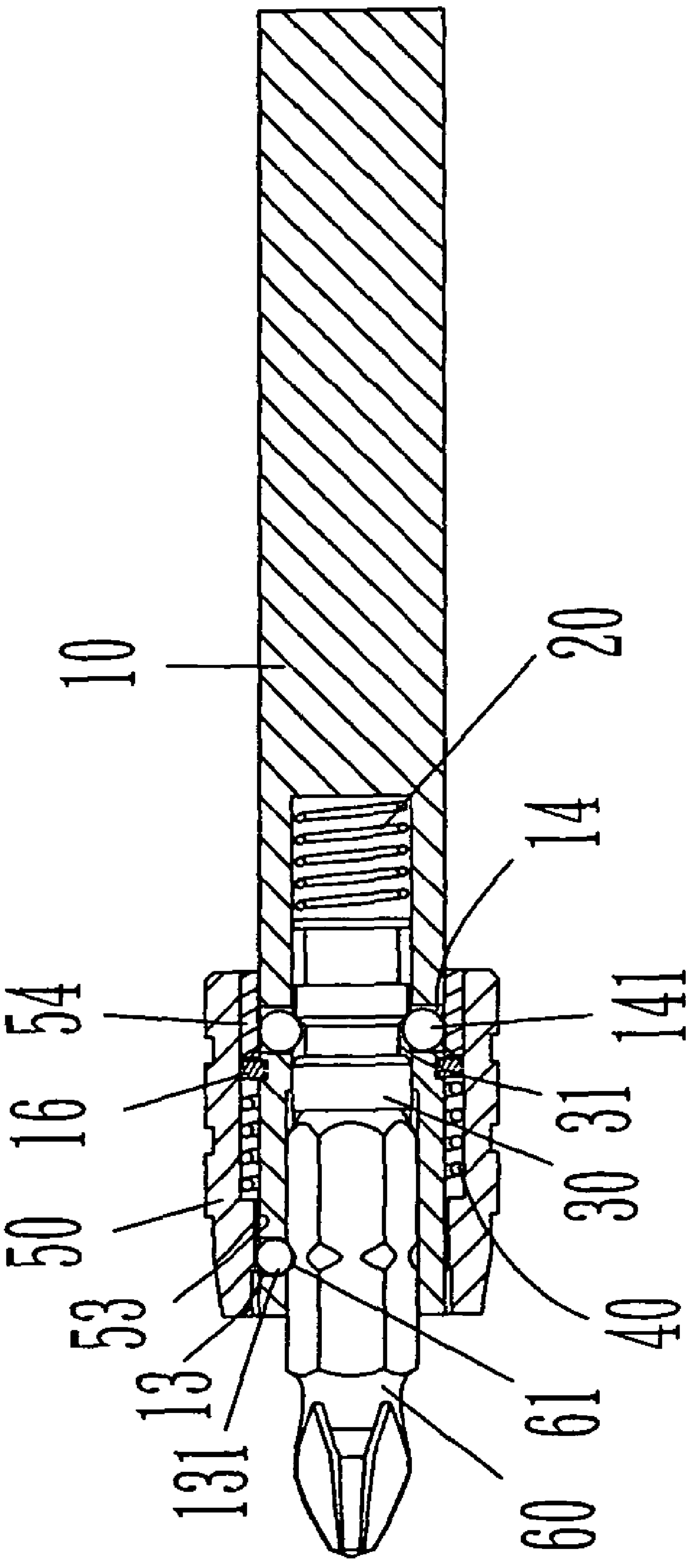
Figure 6:
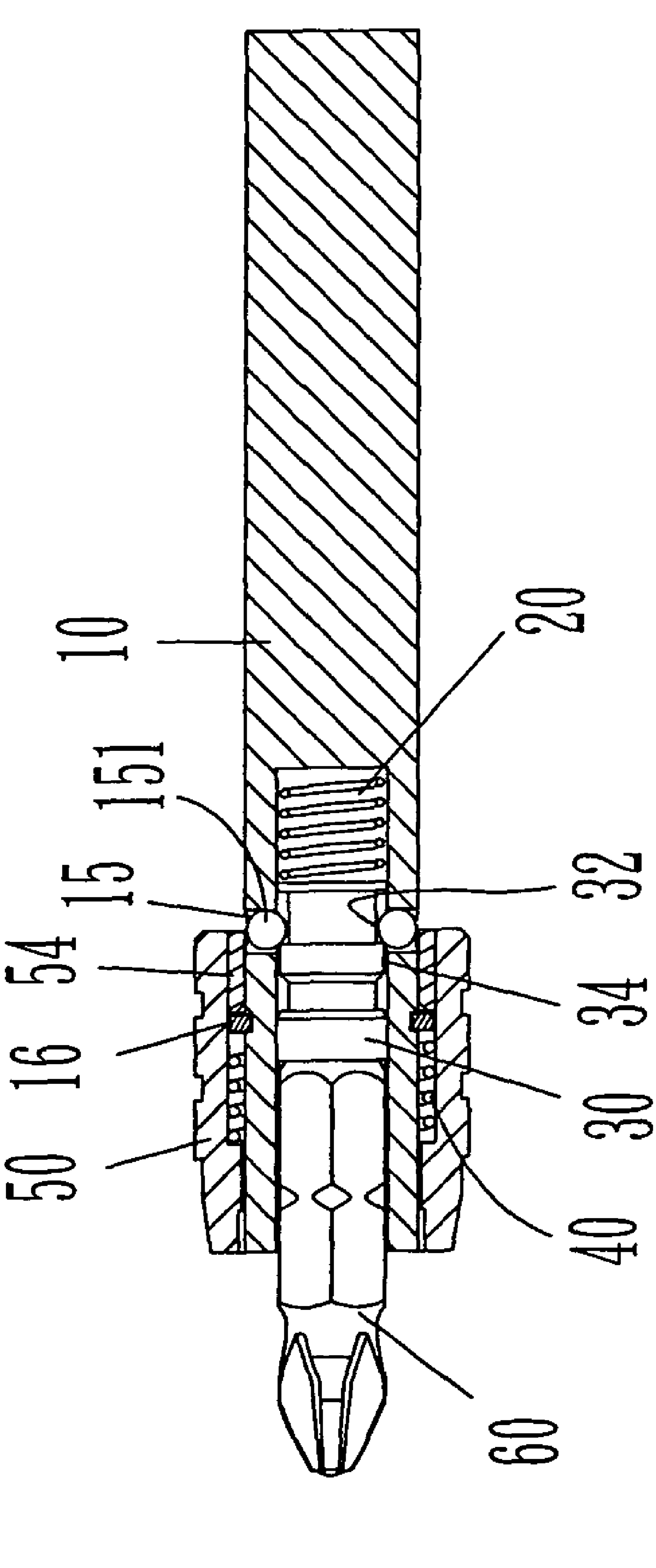

FIGS. 5 and 6 are two different sectional views when a bit 60 is loaded and firmly fixed with the bit holder. When a bit is pushed in towards the cylinder cavity 12 until the front groove 31 meets with middle ball holes 14, the middle balls 141 will slide into the front groove 31 and completely hide inside the middle ball holes 14, which releases the limiting ring 54 from blockage of middle balls 141, and the back balls 151 that originally stay at back groove 32 are pushed back to the convex ring 34 due to movement of the sliding tube 30; at the same time, the depressed outer spring 40 releases power, pushing the fixing cap 50 forward until the inner wall of the limiting ring 54 hits against the c-clamp 16, the back recess 53 meets front ball holes 13, and the front balls 131 move towards the polygon hole 11. While the fixing cap 50 is in motion, the bit is also moving. When the front balls 131 start to beetle into the polygon hole 11, the fitting concaves 61 of the bit 60 are also in line with front ball holes 13, which makes front balls 131 fit into the fitting concaves 61 completely and thus the bit 60 being tightened firmly in right position.

Provided a bit 60 is firmly fixed inside the polygon hole 11. To unload the bit 60, the fixing cap 50 needs to be pushed backwards until the front recess 52 meets with front ball holes 13, and the front balls 131 can have rooms to unfit from the fitting concave and fully nest inside the front ball holes 13. Thus, all components will be in same status as shown in FIGS. 3 and 4. With all aforementioned, the invention deserves grant of a patent based on its capability of industrial application and absolute novelty. The example illustrated above is just an exemplary embodiment for the invention, and shall not be utilized to confine the scope of the patent. Any equivalent modifications within the scope of claims of the patent shall be covered in the protection for this patent.

What is claimed is:

1. A screwdriver bit holder structure comprising: a holder body that sets a polygon hole along the shaft axis, a cylinder cavity sharing the same axis of center as the polygon hole, an inner spring and a sliding tube inside the cylinder cavity, and front ball holes and front balls in one end; a fixing cap with an inner hole is capped around said polygon hole on said holder body and an outer spring is set inside said fixing cap; the features comprising: the said holder body is clipped by a c-clamp, on one side of which said outer spring is against, and on the other side of which set middle and back ball holes on said holder body with middle and back balls nesting inside the said holes; a front and a back groove are set on said sliding tube to contain said middle and back balls; at the front end of said inner hole of said fixing cap set a front and a back recess for said front balls to stay against, and at the back end sets a limiting ring to limit its movement up to the said c-clamp.

2. The screwdriver bit holder structure of claim 1, wherein a stopping ring is set at the back of said back groove of said sliding tube for said back balls to stay against and stop said sliding tube's forward moving.

3. The screwdriver bit holder structure of claim 1, wherein a magnet is set at the front end of said front groove of said sliding tube.

4. The screwdriver bit holder structure of claim 1, wherein the radius of said front recess is greater than that of said back recess.

* * * * *